Nov. 22, 1966 P. G. HOLTKAMP 3,287,073
REFRIGERATED FOOD DISPENSER AND STORAGE CONTAINER
Filed June 8, 1964 2 Sheets-Sheet 1
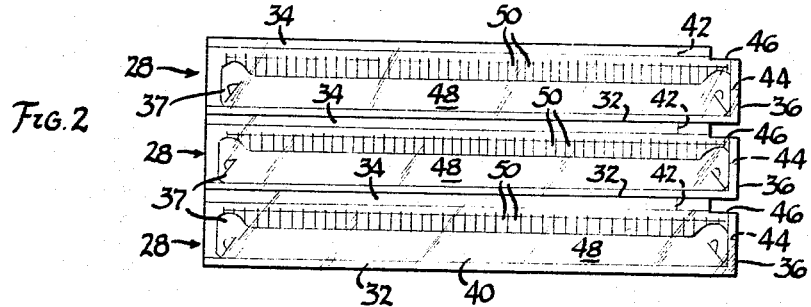
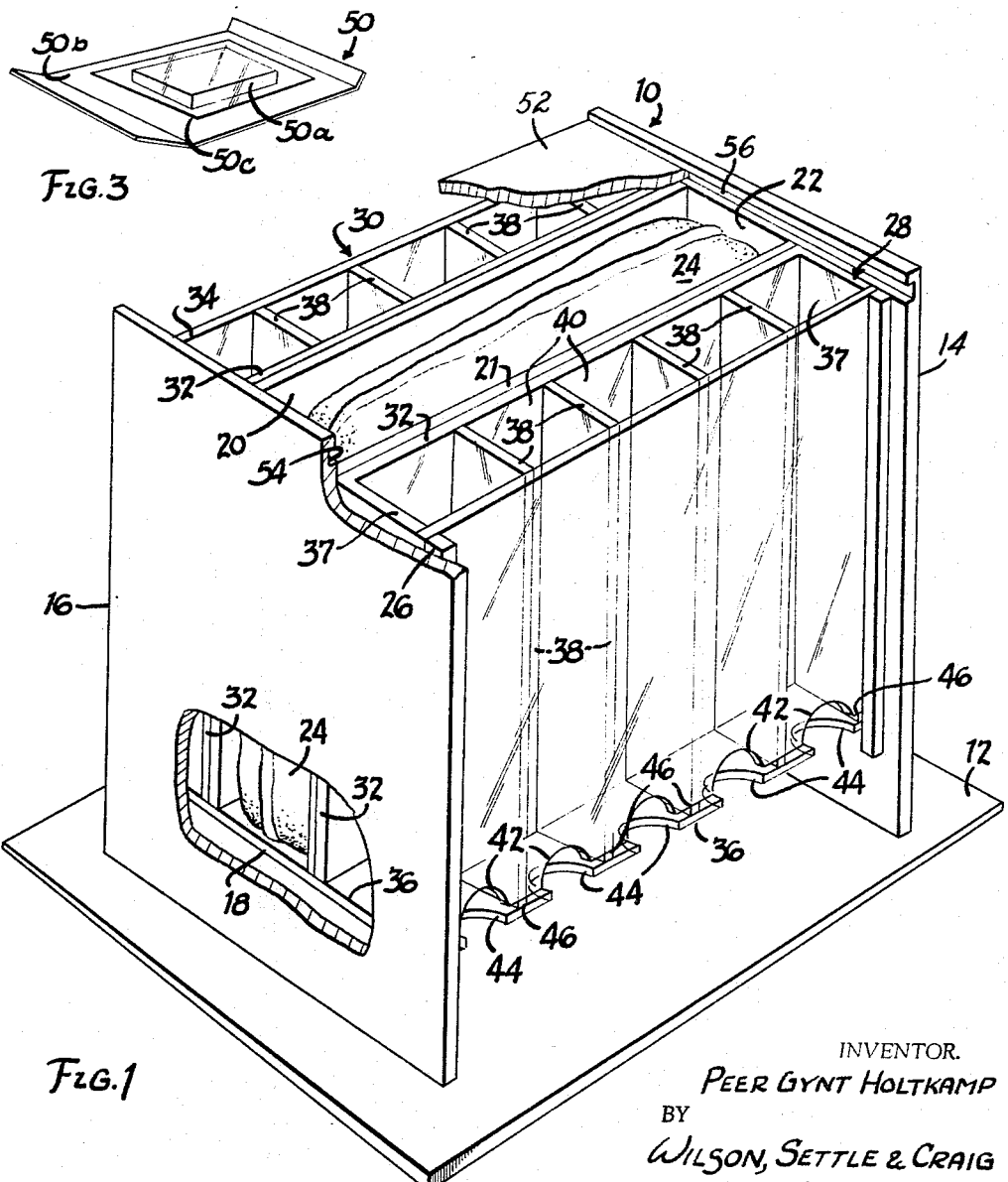
INVENTOR.
PEER GYNT HOLTKAMP
BY
WILSON, SETTLE & CRAIG
ATTORNEYS Nov. 22, 1966 P. G. HOLTKAMP 3,287,073
REFRIGERATED FOOD DISPENSER AND STORAGE CONTAINER
Filed June 8, 1964 2 Sheets-Sheet 2
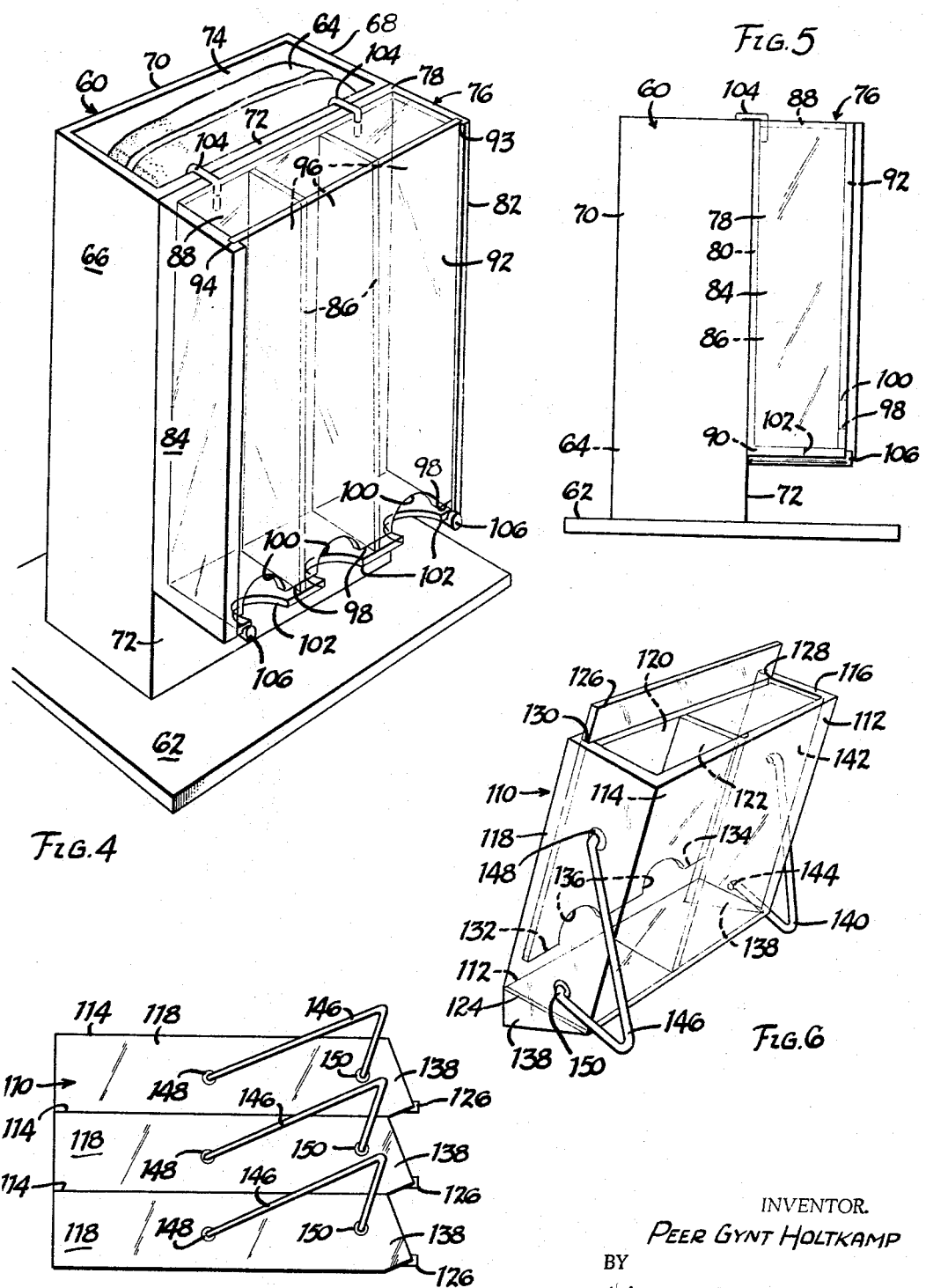
INVENTOR.
PEER GYNT HOLTKAMP
BY
WILSON, SETTLE & CRAIG
ATTORNEYS United States Patent Office 3,287,073
Patented Nov. 22, 1966

3,287,073
REFRIGERATED FOOD DISPENSER AND
STORAGE CONTAINER
Peer Gynt Holtkamp, 1731 Linden Ave.,
East Lansing, Mich.
Filed June 8, 1964, Ser. No. 373,287
8 Claims. (Cl. 312—36)

This invention relates to a package dispensing unit and more particularly to a dispensing unit adapted to refrigerate and dispense relatively flat individual packages or containers of butter pats, spreads, condiments and like foods.

The invention broadly contemplates a refrigerated food dispensing unit of simple attractive design which may be easily and inexpensively assembled of sanitary, easily cleaned members adapted to facilitate the rapid one-by-one selection and rapid serving of individual prepackaged containers of various refrigerated foods. The invention further contemplates a combination storage and food dispensing container which may be preloaded with opened cartons of commercially available food packages of the type indicated and stored in a conventional refrigerator until needed for food serving use. Such a container may be removably mounted on a support member forming a receptacle adapted to receive and contain a suitable cooling medium such as cracked or crushed ice or a prefrozen plastic bag or container of a suitable coolant. The food package dispensing containers may be fabricated and assembled from an easily cleaned non-tarnishing metal and/or transparent plastic providing for sanitary attractive display and facilitating rapid selection of the individual food packages.

Commercially available individual food packages of the type indicated have recently gained widespread acceptance in various food serving establishments. Although initially somewhat more expensive than bulk packaging, such individual food packages have been found more economical to use due to the labor savings involved in patting butter and similar spreads and in filling individual or table serving containers with such foods. Such prepackaged food containers have also been found to eliminate a certain amount of waste and to prevent the possibility of food contamination attendant the serving of bulk packaged foods. The refrigerated food dispensing containers of the invention have been found to further enhance the sanitary, economical use of such individual food packages for both the high speed selection of cafeteria style serving and the more casual selection provided by table size dispensers.

The foregoing and other objects, advantages and features of the invention will be apparent from the following description of several illustrative embodiments, having reference to the accompanying drawings, in which:

FIGURE 1 is a perspective view of a refrigerated food dispensing unit constructed in accordance with the invention and intended for cafeteria or large restaurant use and having portions thereof broken away and sectioned to show certain details of construction;

FIGURE 2 is a side elevational view of several of the food dispensing containers such as shown in FIGURE 1 and illustrates the manner in which these containers may be removed from the refrigerated support or stand, preloaded with open cartons of individual food servings and then stacked in refrigerator storage until needed;

FIGURE 3 is a perspective view of a serving or pat of butter processed and packaged for individual selection and serving from one of the illustrative food dispensing units;

FIGURE 4 is a front quarter perspective view similar to FIGURE 1 showing an alternative food refrigerating and dispensing unit constructed in accordance with the invention;

FIGURE 5 is a side elevational view of the food dispensing unit of FIGURE 4;

FIGURE 6 is a rear quarter perspective view of a small individual food package dispensing unit constructed in accordance with the invention and capable of table serving use; and FIGURE 7 is a side elevational view showing several of the food dispensing units of FIGURE 6 stacked for refrigerator storage.

Referring more particularly to FIGURE 1, a food dispensing unit incorporating several aspects of the invention is indicated generally by the reference numeral 10. This unit comprises a support frame supporting a central coolant storing chamber 22. Two containers 28 and 30 are mountable on opposite sides of the support frame. These containers each have a plurality of compartments adapted to store and dispense individual food serving packages therefrom upon manual selection and removal.

The support frame of the illustrative embodiment includes a base plate 12. Two end walls 14 and 16 are suitably secured to the base plate and extend upwardly therefrom in spaced parallel relation. These two end walls are interconnected by a bottom wall 18 extending therebetween in spaced parallel relation above the base plate. The end walls are further joined by two side walls 20 and 21 secured to the bottom wall and extending upwardly therefrom in spaced relation to the lateral side edges of end walls 14 and 16. The side, end and bottom walls thus coperate to form the coolant storage chamber or receptacle 22. As indicated above, this chamber may be filled with crushed or cracked ice or with a suitable coolant containing container or plastic bag 24.

Two opposing guide rails or slide members 26 are suitably secured to the inner surfaces of the two end walls on each side of the support frame in spaced parallel relation to the adjacent side wall of the coolant chamber and the vertical edge of the end wall. These guide rails cooperate with the portions of the bottom wall 18 projecting outwardly of side walls 20, 21 to slidably support each of the food package dispensing containers 28 and 30 in a vertical dispensing position above the base plate 12 and in cooling engagement with the adjacent side wall of the coolant receptacle.

The two containers 28 and 30 are identical in construction and may be interchangeably mounted and used on either side of the support member. As shown in FIGURES 1 and 2, these containers may be suitably and attractively formed of transparent plastic. Each container includes spaced parallel back and front walls 32 and 34, respectively, and a bottom end wall 36. The spaced front and rear walls are interconnected by two opposite side walls and by a plurality of dividers or partitions 38. These partitions subdivide the container into a plurality of compartments. Each of these compartments is adapted to receive and store an open carton or stack of individual food packages or serving containers for subsequent manual selection. The bottom wall 36 of each container is secured to the lower edges of the rear wall 32 of the side walls 37 and of the partitions 38. The bottom edge of the front wall 34 of each container is spaced above the forward or outer edge of the bottom wall to form individual food package dispensing slots 46 opening to the several compartments.

Opposing cutouts may be provided as shown at 42 and 44 in the adjacent slot forming edge portions of the front and bottom walls 32 and 36, respectively. These cutouts cooperate with the supported elevation of the container above the base plate to provide finger grasping access facilitating the manual selection and withdrawal of the individual food containers or serving pats from the several compartments.

As shown in FIGURE 2, the several containers 28 may be preloaded by inserting open cartons 48 of the individual food serving packages 50 into the open ends of the several compartments distal from the bottom end wall 36 and the dispensing slots 46. The filled containers may then be stacked and refrigerated in the horizontal position shown until needed.

The coolant refrigerated dispensing unit has particular advantage in the economical sanitary serving of individual butter pats suitably processed for such storage and dispensing. Such butter pats are normally packed in half pound cartons having 45, 60 or 90 pats per carton. As shown in FIGURE 3, such commercially available butter packaging mounts each pat of butter 50a centrally of a substantially square heavy paper plate 50b. A cover 50c of light translucent paper or transparent sheet material is then placed on top of each pat of butter.

Returning briefly to FIGURE 1, the end walls 14 and 16 of the illustrative support frame project slightly above the coolant chamber side walls and the upper ends of the food package dispensing containers. These upper portions of the two end walls each have opposing grooves 54 and 56 formed therein. These grooves slidably mount a cover member partially shown at 52 which is adapted to close the upper ends of the coolant chamber 22 and of the several food package receiving compartments 40 of the containers 28 and 30.

The somewhat simpler and smaller dispensing unit shown in FIGURES 4 and 5 is indicated generally by the reference numeral 60. In this embodiment, the support frame comprises a base plate 62 supporting a coolant receptacle 74 of rectangular cross section suitably formed by spaced vertical end walls 66 and 68 and interconnecting side walls 70 and 72. As in the previous embodiment, this receptacle may be filled with crushed or cracked ice or may be used to store a plastic bag filled with a suitable coolant.

A combined storage and dispensing container 76 is removably supported on one side of the coolant receptacle above the base plate 62 in cooling relation with the receptacle side wall 72. This container comprises a recessed tray 78 having a rear wall 80 extending transversely between spaced side walls 82 and 84. The upper and lower ends of the tray are closed by spaced parallel walls 88 and 90. Two dividers 86 are secured to the rear wall and extend between the upper and lower end walls 88 and 90, respectively, in parallel spaced relation to the two side walls. These dividers subdivide the tray into several compartments adapted to receive the prepackaged individual food serving containers. A transparent plastic cover 92 for the container 76 is slidably mounted in two opposing grooves 93 and 94 formed in the side walls 82 and 84, respectively. After initial insertion at the upper end of these grooves, the cover 92 may be subsequently shifted to a substantially closed position wherein the bottom edge of the cover abuts the partition members as shown and cooperate with lower end wall 90 to form dispensing slots 98 opening to the several compartments.

As in the previous embodiment, the slot forming edges of the front cover 92 and of the bottom end wall 90 may be notched or cutout at 100 and 102 to provide finger access openings facilitating the manual selection and withdrawal of individual food packages from the several compartments of the container 76.

In this embodiment, the combined storage and dispensing container 76 is removably secured and supported on the coolant receptacle of the support member by two laterally spaced hooks 104 suitably secured to the upper end of the container. These hooks are bent to engage the upper edge of the receptacle side wall 72. The lower end of the container is supported by two horizontally extending pins 106 secured to and projecting outwardly of the receptacle side wall 72 in spaced parallel relation above the base plate 62. The outer ends of these pins are preferably headed or angled upwardly to engage the lower corners of the container 76 as shown.

The small dispensing units indicated generally by the reference numeral 110 in FIGURES 6 and 7 are intended for table use either in commercial eating establishments or in the home. As best shown in FIGURE 6, these table size dispensing units each comprise a rectangular tray or container 112 having a back wall 114 and two parallel side walls 116 and 118. The upper and lower ends of the container are closed by end walls 122 and 124, respectively, which extend transversely between the corresponding opposite ends of the rear and side walls. A divider or partition wall extends between the end walls 122 and 124 in parallel spaced relation to the side walls and forms two compartments. As in the previous embodiments, these two compartments are each adapted to receive a stacked plurality of individual food serving containers. These compartments are normally closed by a transparent cover member 126.

The two side walls 116 and 118 of the tray 112 are of slightly greater depth and have opposing grooves 128, 130 formed therein outwardly of the central partition and end walls of the tray. The lower ends of these two side walls are also extended beyond the lower end wall 124 to form two laterally spaced tray supporting legs 138 which extend the grooves 128 and 130. The cover 126 is slidable in the side wall grooves between a leg supported open position providing loading access to the tray compartments; a closed position shown in FIGURE 7 for sealed refrigerator storage of one or more loaded containers; and a slightly raised opened position providing individual package dispensing slots 132 and 134 opening to the two compartments adjacent the bottom end wall 124.

Preferably, only the slidable cover 126 is provided with finger access cutouts 136 in this embodiment. Hence, the cover acts to close the several compartments of the container when shifted downwardly against the supporting table from its raised slightly open dispensing position shown in FIGURE 6. The container when in use is normally supported in a vertically inclined position by two angled wire brackets 144 and 146 which are suitably anchored at 142, 144 and 148, 150 in the side walls 116 and 118 of the tray, respectively. These wire members cooperate with the side wall formed feet to elevate the dispensing slots 132 and 134 above the supporting table for finger access facilitating manual selection and package withdrawal.

When the table dispensing unit of this last embodiment is to be used for serving individual pats of butter for an extended period of time, a container of suitable coolant may be inserted in one of the tray compartments and used to cool the butter pats placed in the adjacent compartment.

From the foregoing description of several illustrative embodiments, it will be seen that the invention is fully capable of meeting the several stated objectives and advantages. It will be further apparent that various changes might be made in and from the several illustrative dispensers without departing from the spirit and scope of the invention as defined in the following claims.

I claim:

1. A device for cooling and dispensing individual pats or containers of butter, spreads, condiments and the like, comprising, in combination, a support frame provided with a coolant receiving receptacle having at least one vertically disposed side wall, a pat dispensing container subdivided into a plurality of elongated compartments each adapted to receive a plurality of prepackaged pats therein and having pat dispensing slots formed adjacent one end of the several compartments, and means for removably mounting the dispensing container in vertical pat dispensing position against at least said one side wall of the support frame and in proximate pat cooling relation with a suitable coolant medium placed within the receptacle of the support frame.

2. A device for cooling and dispensing individual pats or containers of butter, spreads, condiments and the like foods comprising, in combination, support means provided with a coolant receiving receptacle having two horizontally spaced parallel side walls, two pat dispensing containers each subdivided into a plurality of elongated compartments adapted to receive a plurality of prepackaged food pats, said containers each having a plurality of pat dispensing slots formed adjacent one end of the several compartments, and means for slidably mounting said pat dispensing containers on opposite sides of the support means in cooling engagement with the adjacent vertical side walls of the coolant receptacle.

3. In a device for storing cooling and dispensing individual pats of butter, spreads, condiments and the like, the combination including:
 (a) a support frame, said frame provided with a centrally positioned coolant storage chamber thereon; and
 (b) a pair of oppositely positioned removable butter pat storage trays suspended in a raised position on said frame in a co-extensive abutting relationship to said coolant storage chamber, said removable storage trays adapted for horizontally oriented vertical stacking with other identical storage trays when removed from said frame, said storage trays provided with slot dispensing means along the base thereof for dispensing butter pats therefrom; and
 (c) means for slidably mounting said storage trays on said frame in abutting contact with said coolant storage chamber.

4. In a device for storing, cooling and dispensing individual pats of butter, spreads, condiments and the like, the combination including:
 (a) a flat base member;
 (b) a support frame provided on said flat base member, said support frame provided with a centrally positioned coolant storage chamber thereon in a raised spaced-apart position above said base member; and
 (c) a pair of oppositely positioned removable butter pat storage trays suspended in a raised position on said frame above said base member in a co-extensive abutting relationship to said coolant storage chamber, said removable storage trays adapted for horizontally oriented vertical stacking with other identical storage trays when removed from said frame, said storage trays provided with slot dispensing means along the base thereof for dispensing butter pats therefrom; and
 (d) means for slidably mounting said storage trays on said frame in abutting contact with said coolant storage chamber.

5. In a device for storing, cooling and dispensing individual pats of butter, spreads, condiments and the like, the combination including:

(a) a support frame, said frame provided with a coolant storage chamber thereon;
 (b) a removable storage tray adapted for receiving cartons of pre-packaged butter pats therein and being suspended in a raised position on said frame, said tray being co-extensive with said coolant storage chamber, said removable storage tray including a chamber adapted for receiving a plurality of vertically oriented columns of said butter pats, said storage tray provided with slot dispensing means along the base thereof for dispensing butter pats therefrom; and
 (c) means in association with said tray and said frame for suspending said tray from said frame.

6. In a device for storing, cooling and dispensing individual pats of butter, spreads, condiments and the like, the combination including:
 (a) a flat base member;
 (b) a support frame provided on said flat base member, said support frame provided with a coolant storage chamber thereon in a raised spaced apart position above said base member;
 (c) a removable butter pat storage tray adapted for receiving cartons of pre-packaged butter pats therein and being suspended in a raised position on said frame, said tray being co-extensive with said coolant storage chamber, said removable storage tray including a chamber adapted for receiving a plurality of vertically oriented columns of said butter pats, said storage tray provided with slot dispensing means along the base thereof for dispensing butter pats therefrom; and
 (d) means in association with said tray and said frame for suspending said tray from said frame.

7. In a device according to claim 5 wherein a front cover is slidably mounted on said removable storage tray, said front cover cooperating with said storage tray to provide said slot dispensing means along the base of said storage tray for dispensing butter pats therefrom.

8. In a device according to claim 3 wherein a front cover is slidably mounted on each of said removable butter pat storage trays, said front covers cooperating with said storage trays to provide said slot dispensing means along the base of said storage trays for dispensing butter pats therefrom.

References Cited by the Examiner

UNITED STATES PATENTS

| | | | |
|---|---|---|---|
| 1,564,529 | 12/1925 | Carter | 312—43 |
| 1,714,469 | 5/1929 | Hoffman | 312—45 |
| 2,805,111 | 9/1957 | Jarnot | 312—42 |
| 2,826,471 | 3/7958 | Fonda | 312—36 |
| 2,860,941 | 11/1958 | Fromwiller | 312—36 |
| 3,007,177 | 11/1961 | Jackson et al. | 312—45 |
| 3,097,899 | 7/1963 | Dean et al. | 312—36 |

CLAUDE A. LE ROY, *Primary Examiner.*

J. PETO, *Assistant Examiner.*